Sept. 20, 1955 W. B. HILDMANN 2,718,018
MACHINE FOR PRESSING AND BUILDING-IN BOOKS
Filed Aug. 10, 1953 11 Sheets-Sheet 4

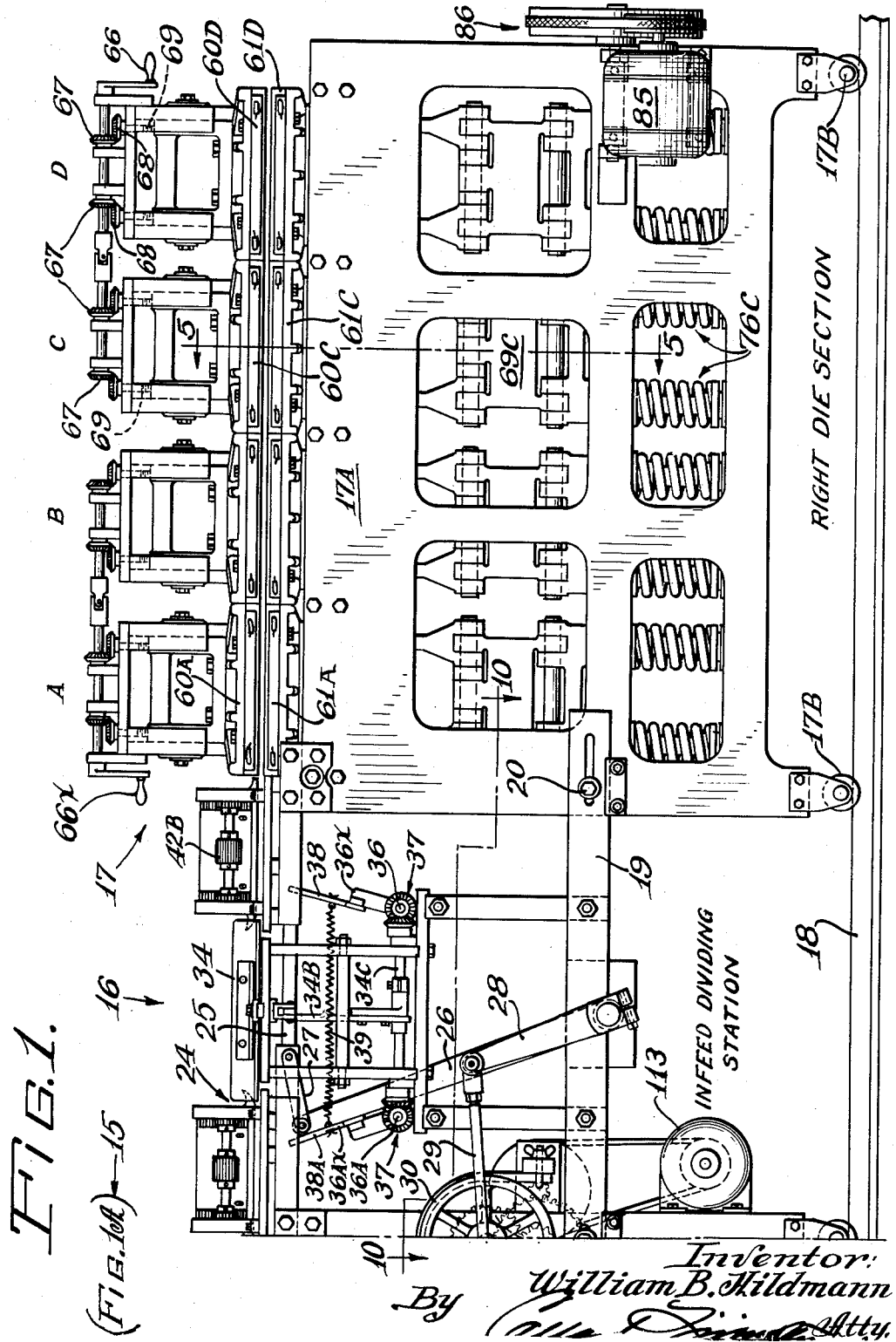

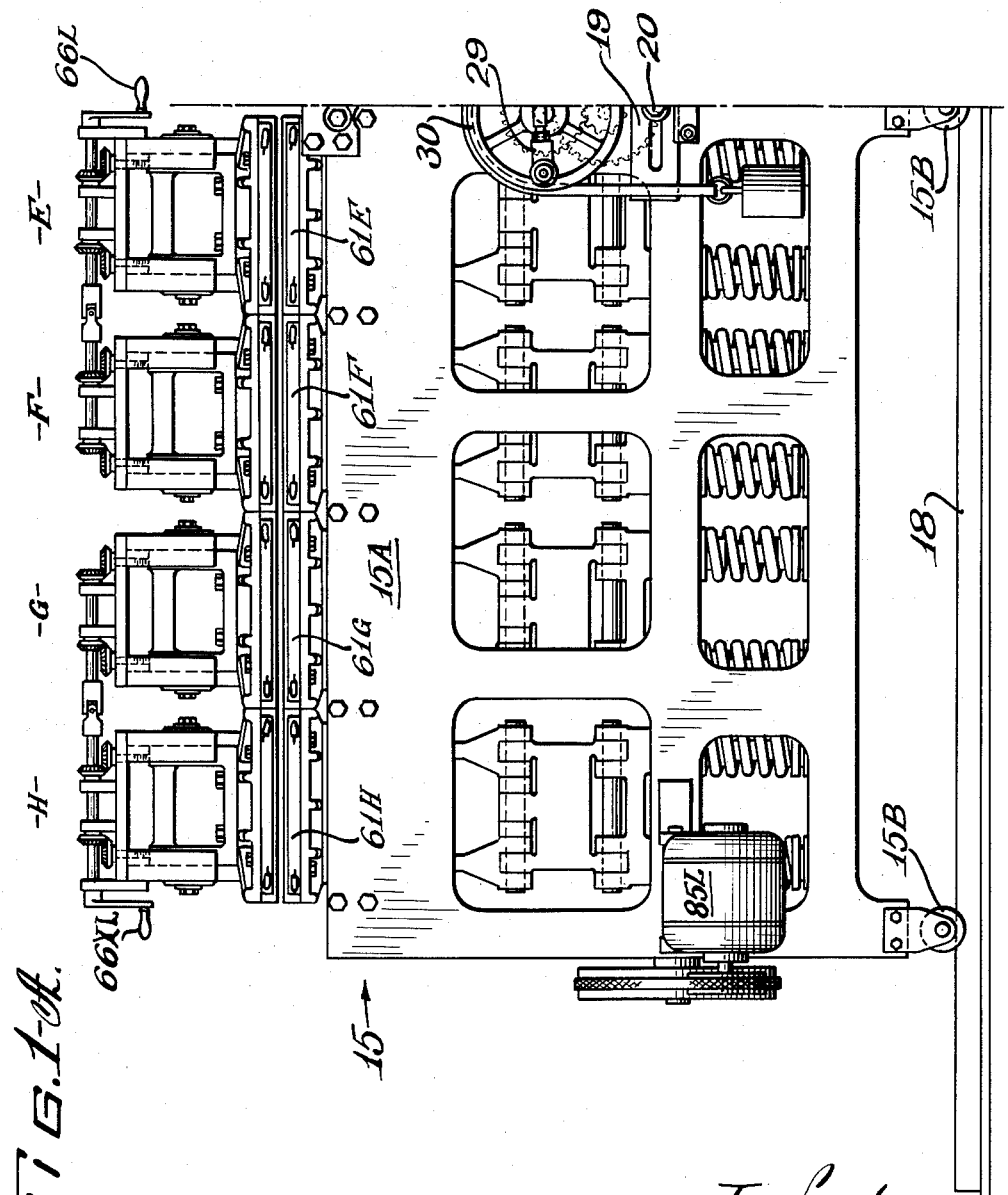

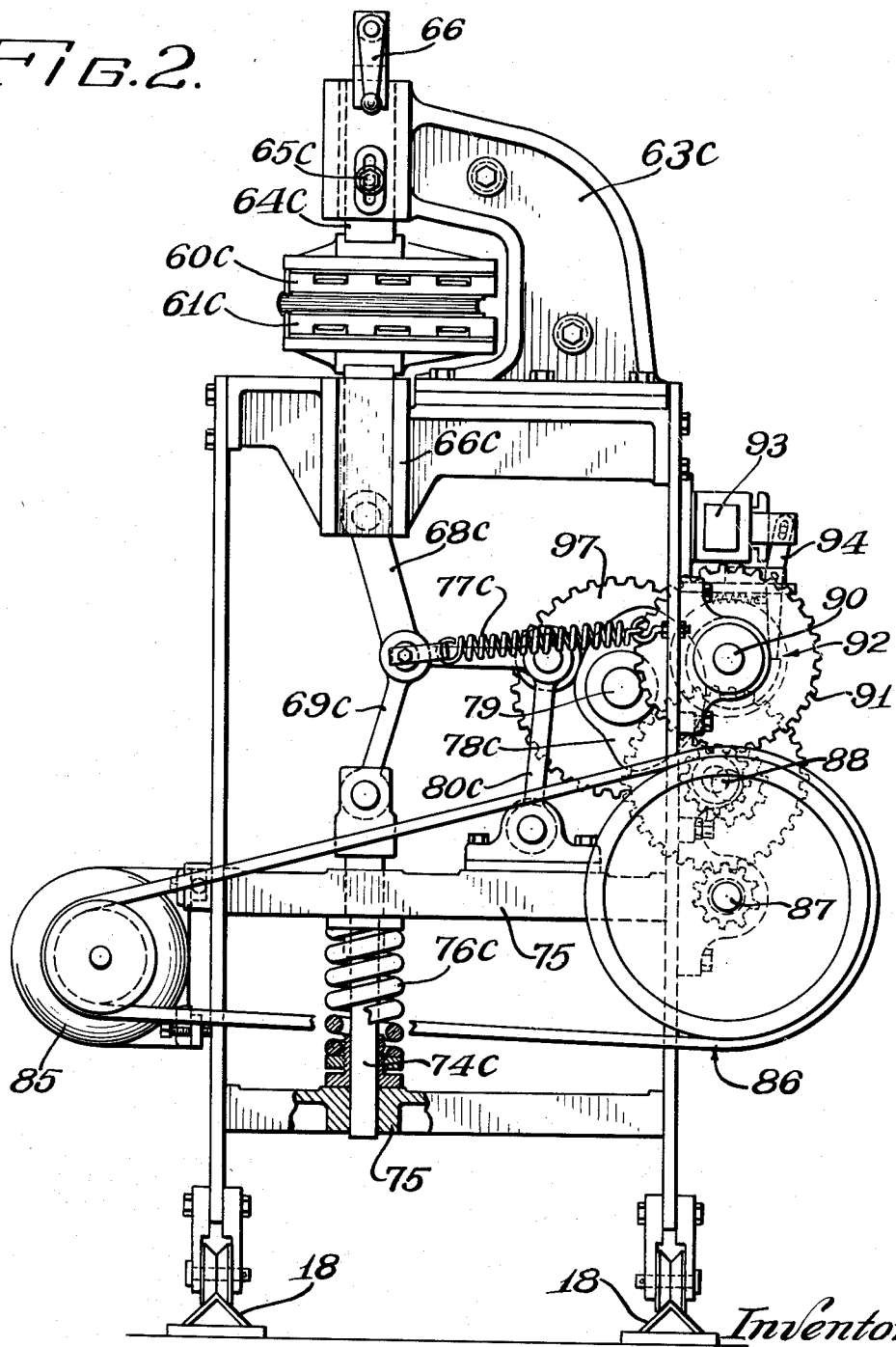

FIG.3.

Inventor:
William B. Hildmann
By [signature]
Atty.

Sept. 20, 1955

W. B. HILDMANN 2,718,018

MACHINE FOR PRESSING AND BUILDING-IN BOOKS

Filed Aug. 10, 1953

Inventor:
William B. Hildmann
By [signature]
Atty.

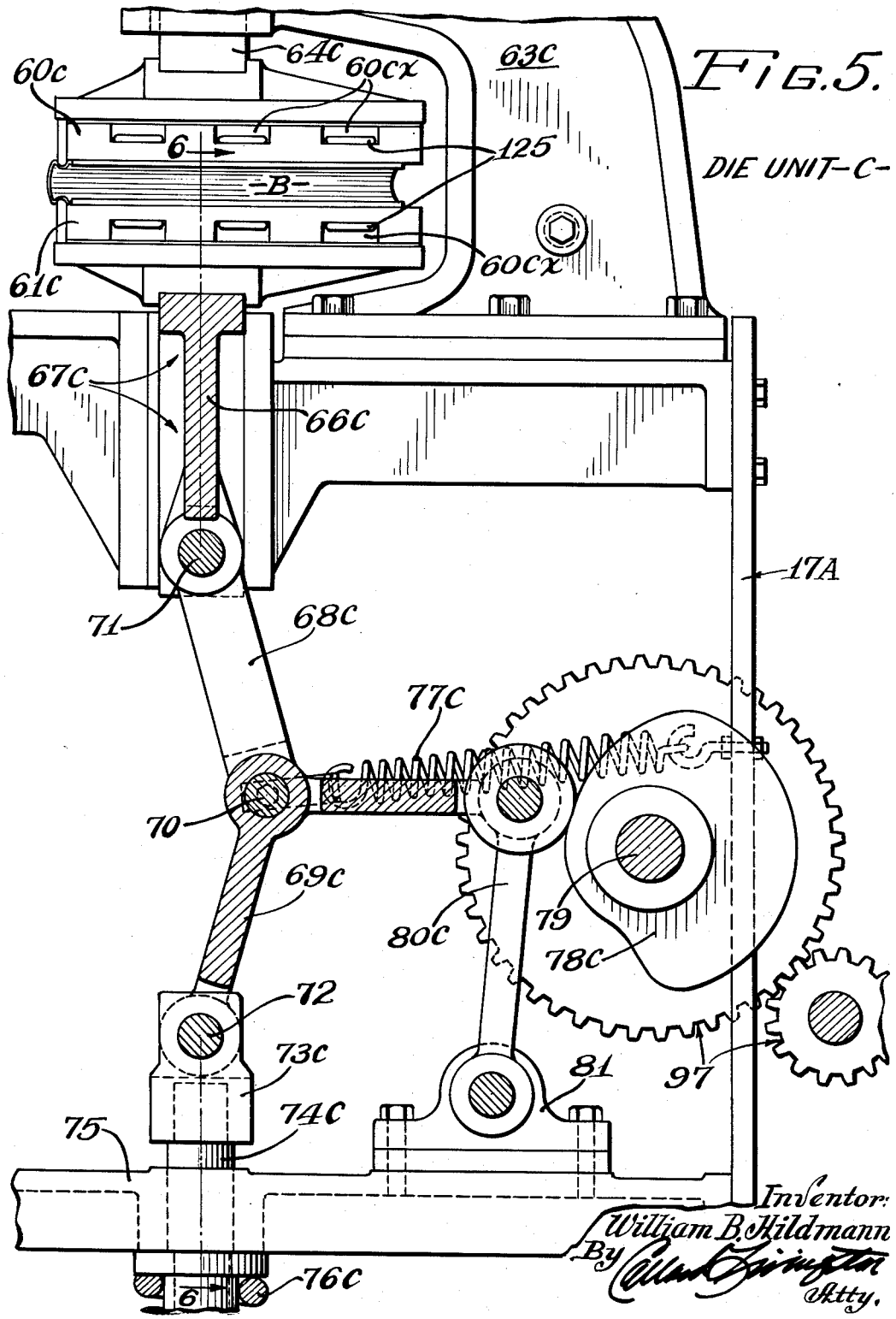

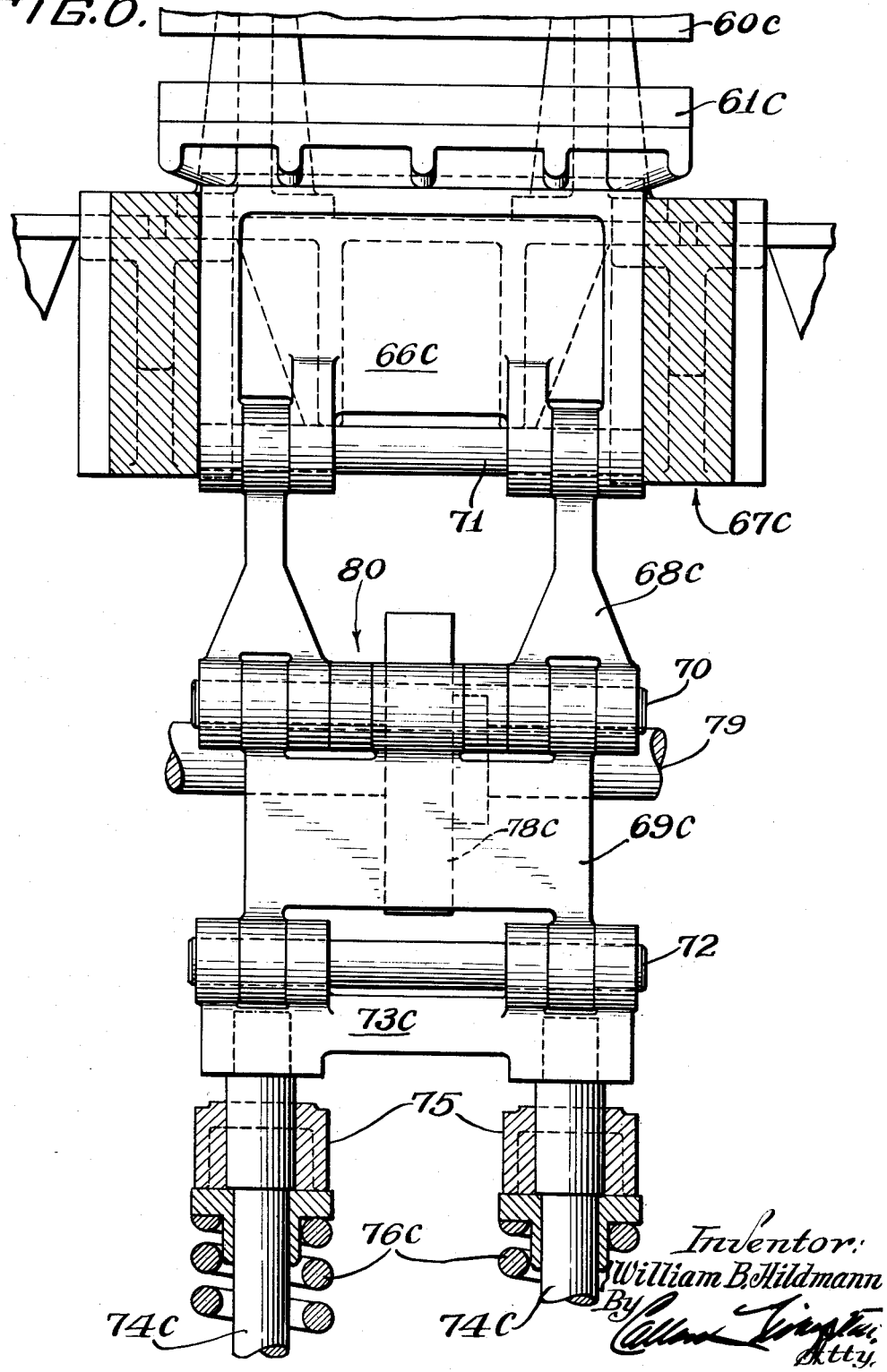

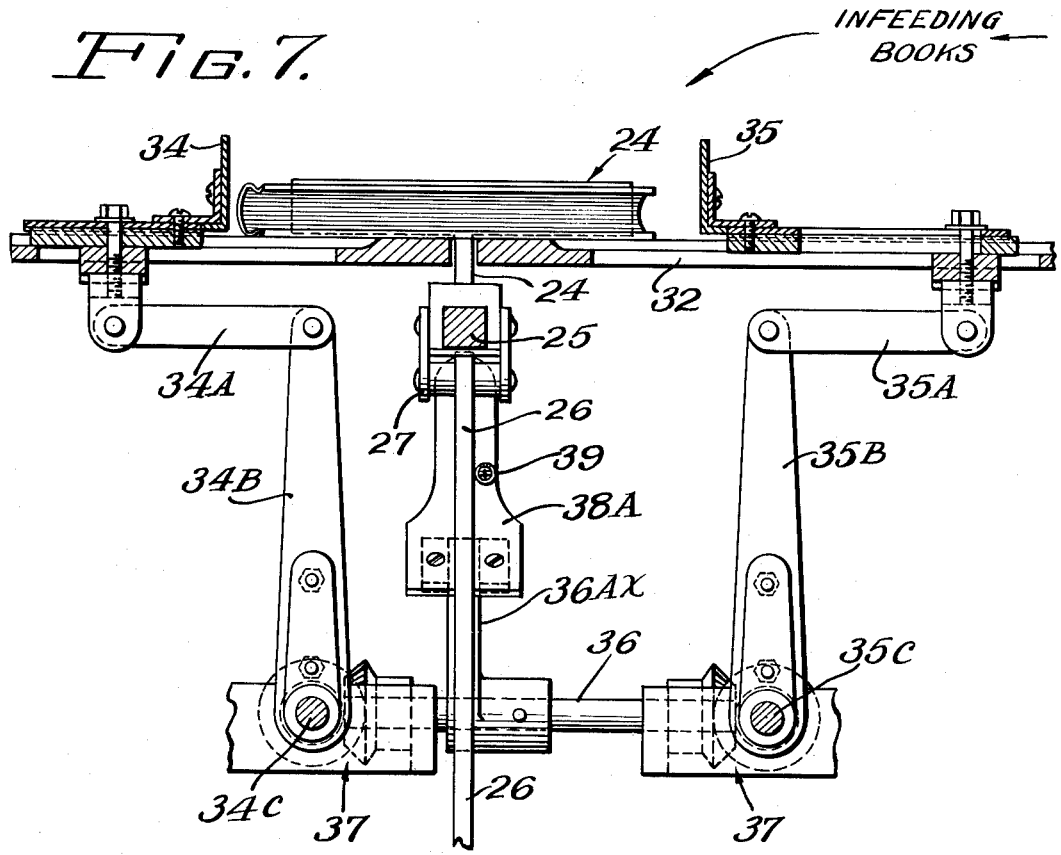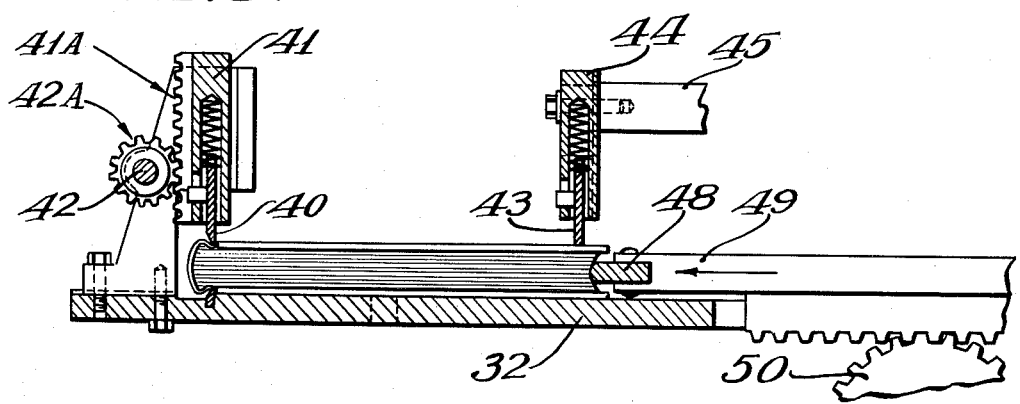

Sept. 20, 1955 W. B. HILDMANN 2,718,018
MACHINE FOR PRESSING AND BUILDING-IN BOOKS
Filed Aug. 10, 1953 11 Sheets-Sheet 9

Inventor:
William B. Hildmann
By
Atty.

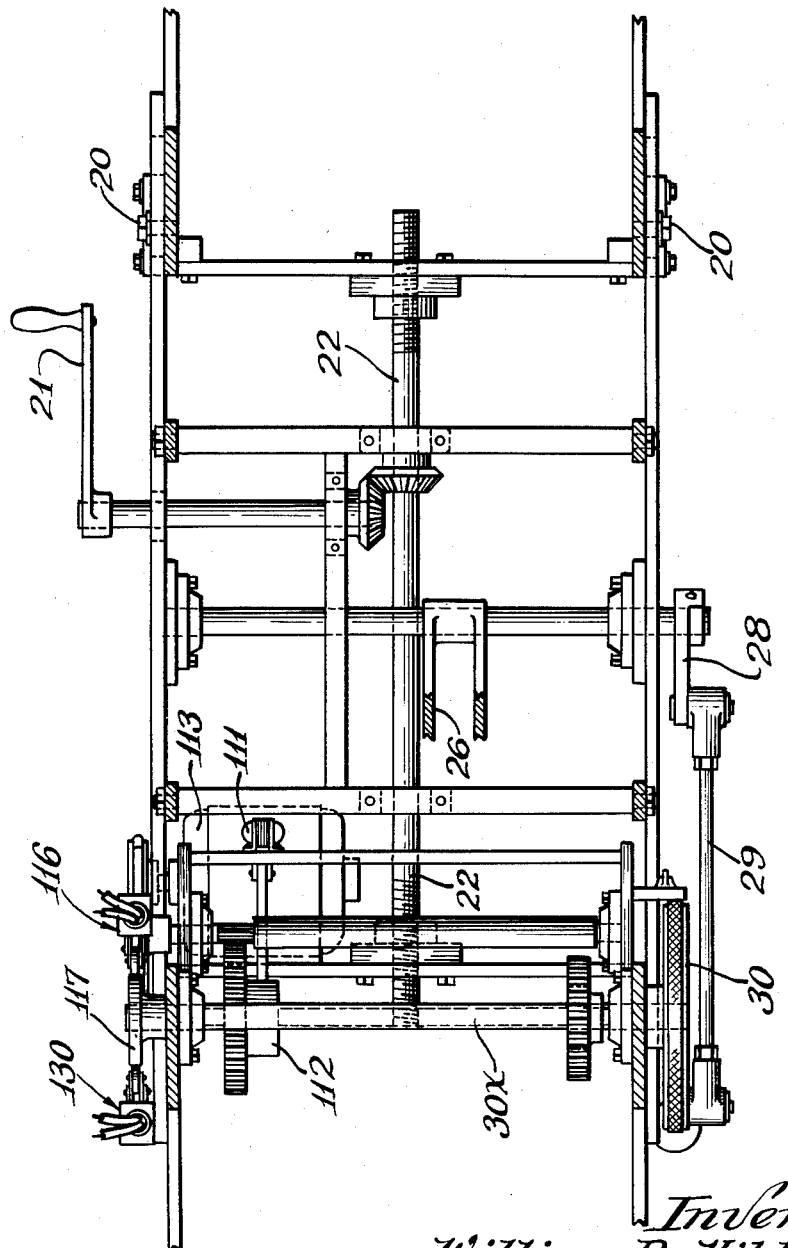

Sept. 20, 1955     W. B. HILDMANN     2,718,018

MACHINE FOR PRESSING AND BUILDING-IN BOOKS

Filed Aug. 10, 1953     11 Sheets-Sheet 11

FIG. 12.

Inventor:
William B. Hildmann

United States Patent Office 2,718,018
Patented Sept. 20, 1955

2,718,018

MACHINE FOR PRESSING AND BUILDING-IN BOOKS

William B. Hildmann, Chicago, Ill., assignor to Brock and Rankin, Inc., Chicago, Ill., a corporation of Illinois Application August 10, 1953, Serial No. 373,100

20 Claims. (Cl. 11—1)

This invention has as its principal object the provision of a simplified, highly efficient and reliable machine for building-in newly bound books which have been cased-in with the use of thermosetting adhesives.

Among the more specific objects and features of the machine are the provision of a divided feeding means by which the books are directed into alternate die sections in order to afford adequate processing time for proper compression of the cover boards and treatment of the thermosetting adhesive, while at the same time enabling the machine to keep up with the output of the faster types of casing-in machine.

Another feature is the provision of a spring-relieved power toggle compression mechanism for simultaneously closing sets of dies upon the books with great force while affording automatic overload relief to prevent damage to the books and machine in case of books of irregular dimension or construction, jam-ups, and like dangers.

A further feature is the provision of a simplified infeeding mechanism for dividing the flow of incoming books into the alternate die sections and accurately controlling and timing the movement of books and the operation of the dies in each section by the deposit of incoming books at the infeeding station;

Additional objects and aspects of novelty and utility relate to the master cycling control means and certain ancillary duty-cycle control mechanisms, and to details of the construction and operation of the preferred embodiment of the machine described hereinafter in view of the annexed drawings, in which:

Figs. 1 and 1-A are complementary views which, when read together, show the complete building-in machine in side elevation;

Fig. 2 is an end view of the machine including a sectional detail and showing one die unit and the appertaining power toggle and cam drive mechanism;

Fig. 3 is a fragmentary top plan view of the central portion of the machine at the dividing infeed or receiving station;

Fig. 5 is an enlarged detail, partly in elevation and partly in section, of portions of one of the die and power-toggle units at station —C—, as seen in the direction of lines 5—5 of Fig. 1 and showing parts also seen in Fig. 2;

Fig. 6 is an enlarged vertical sectional detail transversely through a portion of the power toggle unit at station —C—, as seen in the direction of lines 6—6 of Fig. 5;

Fig. 7 is a fragmentary cross-sectional detail through the feed table at the book-infeed or dividing station and looking in the direction of lines 7—7 of Fig. 3 to show parts of the feed pawl and the registering bars;

Fig. 8 is a fragmentary cross-sectional detail through the feed bed at the infeed station and showing the creasing, hold-down, and "squaring" irons, as seen in the direction of lines 8—8 of Fig. 3;

Figure 11:
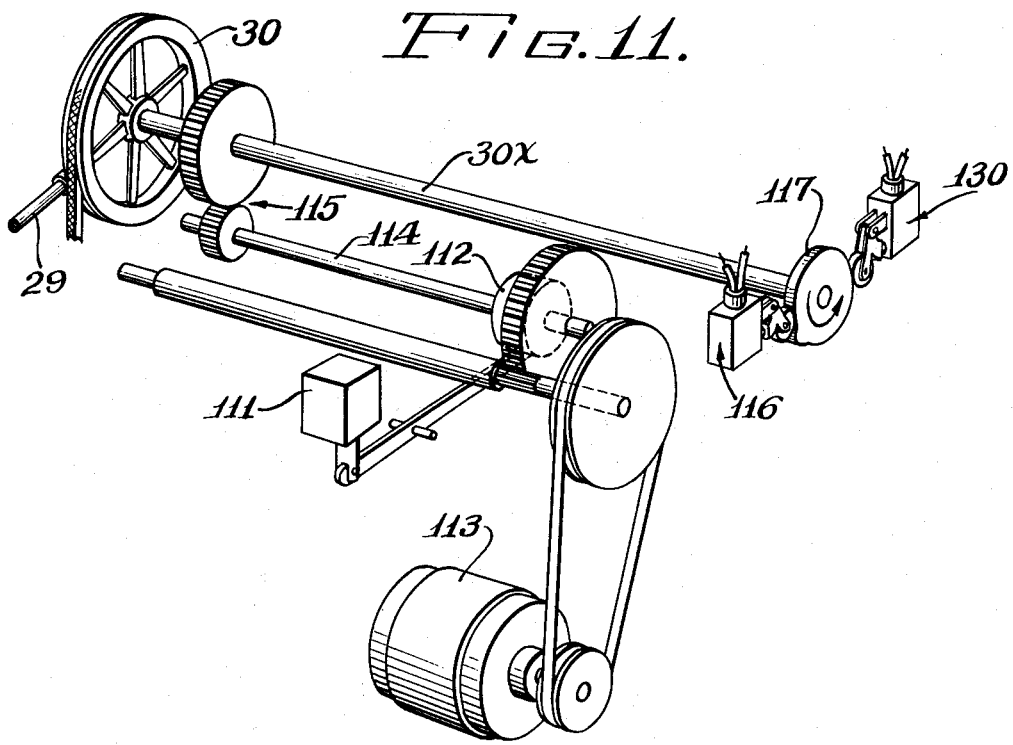
Figures 9, 9A:
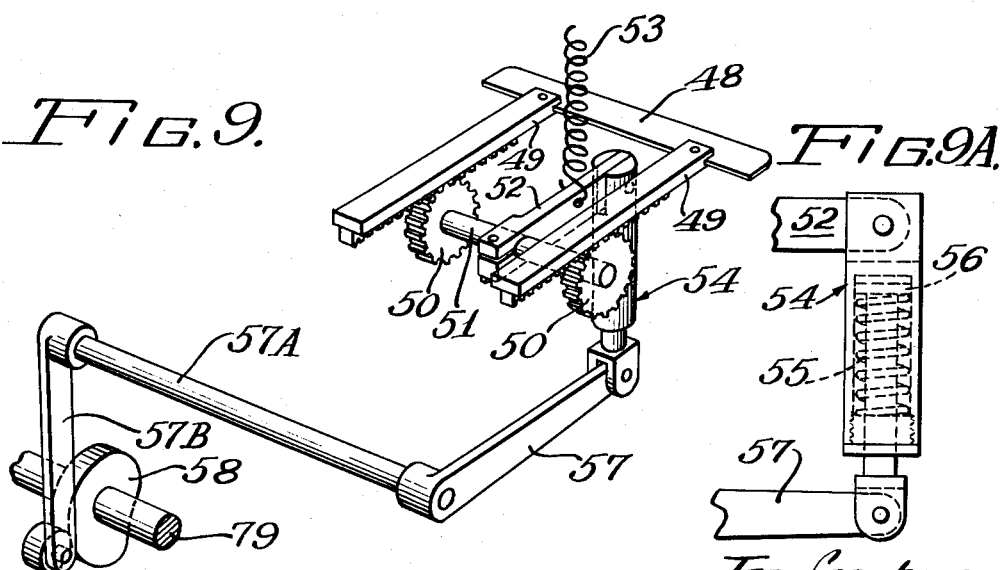
Fig. 9 is a fragmentary perspective detail showing the drive means for the squaring-off device for one die section.

Fig. 9-A is a fragmentary enlarged elevational detail of one of the spring coupling plungers for the squaring-off device;

Fig. 10 is a fragmentary horizontal section taken along lines 10—10 of Fig. 1 beneath the feed table showing parts of the master cycling clutch and switch means;

Fig. 11 is a fragmentary perspective detail showing the master cycling clutch and control switches for the divided feeding system;

Fig. 12 is a schematic layout and wiring diagram for the component functional parts of the machine including a wiring diagram for the master and die-cycling controls.

Considering Figs. 1 and 1-A together, the form of building-in machine disclosed herein consists of two divided die sections flanking a central infeed station. Fig. 1-A shows the left-hand die section 15, while Fig. 1 shows the infeed station 16 and the alternate or right-hand die section 17.

The die sections are adjustably mobile relative to the infeed station, the two chassis 15A, 17A, having wheels 15B, 17B, running on floor rails 18, on which the two die sections are adjustably tied together (Fig. 1) by frame members 19 and locking bolts 20, the loosening of which permits moving the divided sections convergently or divergently with respect to the infeed section 16 by manipulation of crank 21 (Fig. 10), which actuates jack screws 22 for this purpose, such an adjustment being the principal means for accommodating different sizes of book without necessity of changing the stroke of the book-feeding pawl means hereinafter to be described.

Newly cased-in books are deposited at the infeed station 16 at the rate of about 30 per minute, employing one of the faster types of casing-in machine (not illustrated), the casing (meaning a pair of cover boards and cloth hinge or equivalent) being attached to the book signatures by a suitable thermosetting adhesive.

The infeeding books are automatically fed in alternation from right to left into one or the other of the divided die sections 15 or 17. This is accomplished by a reciprocating feed pawl 24 (Figs. 1 and 3) travelling on a slide bar 25 (Figs. 1 and 7) driven by an oscillating lever means 26, 27, which in turn is driven by feed crank means 28, 29, 30, in conjunction with a special cycling means (hereinafter described), which coordinates the feeding of the books with the opening and closing of the dies.

Infeed registering

From the casing-in machine (not shown) the books are delivered onto infeed chute rollers 23 (Fig. 3), which direct the books onto the table 32 to strike a trigger switch 33 and initiate a duty cycle for the building-in machine, the first thing to happen being the registration of the book in proper starting position relative to the die sections and certain creasing and squaring-off devices.

Such registration is effected by a pair of converging and diverging registering bars 34, 35 (Fig. 3) mounted to slide toward and away from each other and the deposited book on the table (as in Fig. 7), this action being produced in the case of the bar 34 by crank means including crank levers 34A, 34B, the latter actuated by shaft 34C which is oscillated by rocker shafts 36, 36A (Figs. 1 and 7) through mitre gears 37.

A duplicate crank leverage means 35A, 35B, 35C, 36, 37, actuates the companion registering bar 35, the four rocker shafts 34C, 35C, 36, 36A, being arranged in quadrangular array, as shown schematically in Fig. 12.

The means for reciprocating the registering bars 34, 35, in absolute synchrony with the feeding movements of the books includes a pair of strike plates 38, 38A (Fig. 1), respectively attached to levers 36X, 36AX, which in turn are respectively fast on rocker shafts 36, and 36A. A long spring 39 tends to draw the two strike plates toward each other when the same are free of the feed lever 26 in moving toward the mid-point of its travel, thereby turning shafts 36, 36A, and (through the mitre gears 37) actuating the twin lever means 34A—34B and 35A—35B, so that the strike plates diverge or converge, depending upon which phase of its operating stroke the feeder lever 26 happens to be in.

In the condition shown in Fig. 1 the feed lever 26 has completed its stroke toward the left-hand die section, causing the strike plates to open up or diverge, with a consequent opening or separating of the two registering bars 34, 35.

Upon reversal of the stroke of the feed lever 26, the long spring 39 will draw the strike plates toward each other to converge upon a book resting on the table and thereby align the book with the die sections by the time the returning feed lever 26 and its pawl 24 reach the book and start it toward the appropriate die section.

Thus, the registering bars 34, 35, are spring-urged into engagement with the book and in such engagement are effectively and safely disconnected from all driving forces except the yieldable force of the spring 39. This is a safety feature in case of jam-ups at the infeed station.

The infeeding books, being thus automatically aligned for proper travel into the machine, are next subjected to what is termed a "squaring-off" operation, heretofore effected reliably only by hand by skillfully seizing the open corners of the book in a certain manner between the thumbs and forefingers and setting the page blocks or signatures hard back into the covers and against the hinge.

As the book leaves the registering means or bars, the hinge portion thereof passes beneath a spring-loaded creasing iron 40 (Fig. 8), working in a vertically adjustable carrier bracket 41 having a rack of teeth 41A engaged by an adjusting pinion 42A on shaft 42, to be manually rotated by a knurled member 42B.

Similarly, the opposite or opening side of this book passes beneath a spring-loaded hold-down iron 43 in a carrier bracket 44 supported on an arm 45 which is slidably seated for adjustment laterally of the table in brackets 46 (Fig. 3).

The book will come to rest beneath the creasing and hold-down irons 40, 43, and at this time a "squaring" iron 48 (Figs. 3 and 8) will move on its slidable rack arms 49 in brackets 50, against the opening edge of the book, and drive the signatures back against the hinge portion, so that the end sheets, page blocks, covers, and hinge are trued-up prior to entry into the die means.

The mechanism for reciprocating the squaring irons 48 include (Fig. 9) a pair of pinions 50, carried on a stub shaft 51 beneath the table 32, and respectively engaging the teeth of the two slide racks. A lever arm 52 is normally elevated by a spring 53, and has a free end connected to a plunger cylinder 54 in which is housed a coupling spring 55 to which a driving effort is transmitted by a stroke plunger 56.

A bell crank leverage 57, 57A, 57B (seen partly in Figs. 3, 4, and 9) is oscillated by a timed squaring cam 58, this motion being transmitted to the plunger 56 through its connection 56A (Fig. 9) with the bell crank lever 57. The timed action of cam 58 is explained hereinafter in conjunction with the description of the power transmission and synchronizing system.

Each duty cycle of the machine concludes with the feed pawl 24 at the end of one or the other feeding strokes, for instance at the extreme left-hand position, as seen in Fig. 1, or the extreme right-hand position which would be adjacent the strike plate 38.

Upon the initiation of the next feeding stroke of pawl means 24, 26, the squaring irons are withdrawn, and the next book to be advanced from the center of the table toward the book lastly described as having been engaged by the squaring iron, will be pushed into the first compressing or die station, the upper die 60A of which is visible in Fig. 3, the complete die unit, including the movable companion die element 61A, being depicted in Fig. 1.

The die units

Since all of the compression dies and appertaining power toggles are identical, the detailed description of one will suffice for all, there being by preference four die units to each of the alternate die sections of the machine.

Referring to Fig. 5, the die unit there shown includes a relatively stationary or upper die member 60C, and its companion, movable die member 61C, closed upon a book —B—.

The upper die is slidably supported in grooves in gooseneck brackets 63C by carriers 64C, which slide vertically in the brackets and are adapted to be locked in position by set screw 65C (Fig. 2).

As seen particularly in Fig. 1, the vertical adjustment of the upper dies is achieved by means of a crank 66 for dies C and D (60C—61C; 60D—61D) driving mitre gears 67 on a shaft which is common to two ganged die units, said gears in turn driving companion gears, e. g. 68, which turn screws 69 to raise or lower the dies in pairs. The crank 66X similarly controls the first two die units A and B (60A—61A; 60B—61B).

The lower die 61C is mounted in a carrier casting 66C (Fig. 5), which reciprocates in a slide casting 67C on the chassis.

Die power toggle

The movable die in each unit is actuated through an appertaining power toggle consisting of a pair of toggle levers (Fig. 5) 68C, 69C, pivotally joined by a knee pin, as at 70, with the upper toggle lever linked to the slidable die carrier by a crank pin 71. The lower toggle lever 69C connects pivotally at pin 72 with a spring relief or backing means including (Figs. 5 and 6) a casting 73C in which are seated a pair of spring plungers 74C working in bores formed in a cross member 75 (Fig. 2) of the chassis.

A heavy backing compression spring 76C surrounds each plunger to work against the toggle, which is normally broken or relaxed by an opening or normalizing spring 77C (Fig. 5).

Driving effort is applied to the toggle by cam means including a power cam 78C (Fig. 5) fixed on a power shaft 79 and working against a bell crank lever 80C, one end of which is fixed in a pillow block 81 on the chassis, and the other end of which works on the toggle knee pin 70.

As the power cam 78C rotates, the crank lever 80C is thrust against the toggle knee at 70, straightening or closing the toggle levers 68C, 69C, and elevating the die 61C against the book —B—, any overload portion of the compressive toggle thrust being absorbed in the backing or relief spring means 76C, so that a maximum compressive force will always be exerted against the book without danger to the latter or the machine in case of any irregularities in the thickness or construction of the book.

Die actuating means

The several die units and their respective power toggles are of identical construction and operation; and the die sets for each of the divided sections are opened and closed in unison; although the two sections operate in alternation, each die section (left or right of the central infeed section) having its own power plant, transmission, and cycling control.

Figure 4:
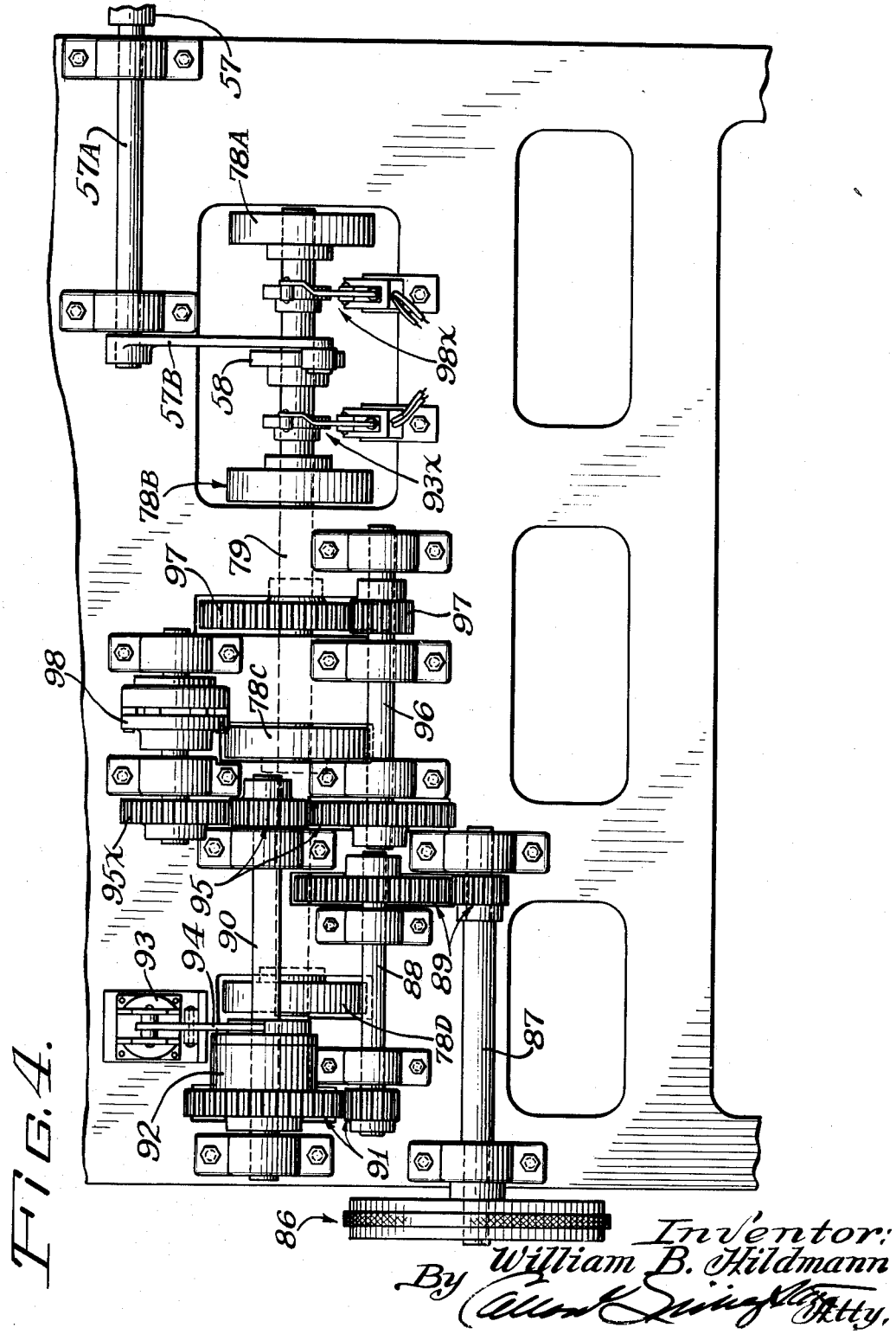
Fig. 4 is a fragmentary rear elevational detail of the machine showing the power transmission gears and part of the cycling control mechanism for one die section.

The power plant for the right-hand die section is an electric motor 85 (Fig. 1), driving through pulley means 86, the main drive shaft 87, which is seen in the rear view of this dividing section as depicted in Fig. 4.

A countershaft 88 is driven through reduction gears 89 from said main drive shaft 87.

A clutch shaft 90 is driven through gears 91 and an electromagnetic clutch means including a commercial form of single-cycle clutch 92 actuated by an electromagnetic solenoid 93 which controls the clutch through a trip lever 94, so that each time the solenoid is energized the clutch means 92 will interconnect the clutch countershaft 90 to the drive shaft 87 for the duration of one revolution of clutch shaft 90, this motion being transferred through gear means 95 to still another countershaft 96, from which driving torque for the cam power shaft 79 is transmitted by gears 97.

An electromagnetic brake 98 is coupled to the power countershaft system through gear 95X.

Thus, it will appear from Fig. 4 that all of the power cams 78A . . . 78D for the four die units A, B, C, D, of the right-hand dividing section (as in Fig. 1) are ganged on the common power shaft 79 and will close their corresponding die units simultaneously.

*Cycling and operation*

It is to be understood that the power transmission and control mechanism described in view of Fig. 4 pertains to the right-hand die section, and that the left-hand section (shown in Fig. 1-A) is provided with an identical transmission and control means to be actuated in alternation with the system of Fig. 4 in the manner now to be described in view of Fig. 12.

From the discharge side of the casing-in machine books are delivered sequentially onto the infeed table (Fig. 12) and engage the trigger switch 33, which connects power via conductor 110 to the coil 111 of a single-cycle clutch 112, interposed between a master cycling and feeding motor 113 and feed shaft 30X for the feeding pawl mechanism, the actual disposition of these cycling clutch parts being shown in Fig. 11.

Gears 115 afford a 2:1 drive ratio between the drive shaft 114 and the crank shaft 30X so that, while the drive shaft 114 under control of clutch 112 makes a single revolution and stops following each energization of master trigger coil 111, the crank shaft 30X makes only one-half revolution, thereby sweeping the book feeding pawl means 24, 26, once across the table and causing the latter to come to a full stop. The feed pawl 24 will not reverse its direction of travel until another book strikes the trigger switch.

Assuming that the feed pawl has come to rest in the position shown in Fig. 12, it is important to observe in the latter view that a master cycling switch 116 will at this time be closed by a master cycling cam 117 on the feed crank shaft, thereby energizing the die-cycling clutch coil 93 for the right-hand die section via conductor 118 to connect the motor means 85 and transmission gearing 89, 91 to the main power cam shaft 79, so that the starting of the latter will cause a holding cam 119 to hold closed the holding switch 93X, thereby completing a holding circuit via conductor 118X for the power cycling clutch coil 93 for the duration of one revolution of the main power or toggle cam shaft 79 before cycle holding switch 93X again opens.

As a result of said one revolution of power toggle shaft 79, all power toggles for the right-hand die units A, B, C, D, will be closed in unison (as in the case of die unit A, Fig. 12), by the action of power cam 78A straightening out the toggle levers 68A, 69A, through the knee crank 80A, so as to drive the movable die member 61A up against a book lying beneath the stationary die 60A.

As the movable die nears the end of its intended compressing stroke, the backing and relief spring 76A takes a divided portion of the toggle thrust which, nevertheless, also acts in the direction of the applied compressive thrust on the book, so that the energy employed is utilized usefully while at the same time affording any necessary relief against overload and breakdown should the book be irregular in thickness or construction or contain a foreign body, or be incompressible for any other reason.

Thus, each of the four movable dies 61A, 61B, 61C, 61D, will close toward its companion die at the same time owing to rotation of the corresponding power cams 78A, 78B, 78C, 78D.

At this juncture it should be clearly understood that the books move sequentially through the linear array of dies in each section and that the leading book entering the first die unit pushes the books ahead; therefore, when the feed pawl 24 comes to rest on the right-hand stroke at the end of one feeding cycle, it will leave a book in the path of the squaring iron 48, and the book which was just previously in this same position will have been pushed into the first die unit 60A, 61A. (See Fig. 3.)

Recalling now that at the end of this feeding cycle or operation of the pawl 24 the master cycling switch 116 was closed to start the main power shaft 63, the "squaring-off" operation goes forward in synchronism with the closing of the dies, since the squaring cam 58 turns in unison with the power cams, so that the crank levers 57, 57A, 57B, are actuated to turn the pinions 50 and reciprocate the racks 49 to engage the squaring iron 48 with the book in the manner and for the purposes heretofore described. (Fig. 12.)

As the main power shaft 79 completes its duty cycle, brake switch 98X is closed by a brake cam 120, thereby energizing via conductor 121 the coil 98A of a known type of electric brake 98 to stop the shaft 79 abruptly and prevent carry-over which would otherwise be occasioned by the opening of the spring-loaded power toggles.

Each of the dies is electrically heated as by heater elements 125 (Fig. 12) which are carried in cavities, as at 60CX, Fig. 5, formed in the die heads.

The construction and operation of the alternate or left-hand die section is identical to that described in detail for the right-hand section, there being a master cycling switch 130 (Fig. 12) closed by the cam 117 when the feed pawl reaches the end of its leftward stroke, so that the alternate cycling clutch 131 (corresponding to the die cycling clutch 92—93 of the right-hand section) will be actuated to initiate a duty cycle for the left-hand section with the same sequence of registering, squaring, compressing, and braking operations heretofore described for the right-hand section, motor 85L being the power plant for this section.

One of the great advantages of the disclosed building-in machine, apart from relative simplicity and rugged reliability, is its speed of operation and capability of keeping up with the output of a fast casing-in machine, while producing a finished book of superior appearance and construction. This advantage is due in part to the divided handling of the books by passing the same to alternate die sections from a central infeed section, and partly to the continuous flow of books from one die to another while being repeatedly subjected to a maximum of pressure in steps of rapid sequence, all without danger to the books or the machine.

The power toggle means is an important feature in this connection, since it affords a safe, fast-acting, and highly efficient compressing means capable of imparting a maximum compressive force to any book with complete safety, while presenting a substantially uniform loading on the common power cam shaft where the dies are ganged for synchronous action in each section.

The combination of the feed means and master cycling switch means affords accurate control in a simple manner; and while the feeding advance of one book by another is accurate, as a practical matter, the sequential placement of the die units in close contiguity renders the accuracy of feeding advance of the books immaterial because it is possible for part of a book to lie in two die units and be properly compressed without danger to the book or the machine, since any irregularity in the thickness of the book will be accounted for by the spring relief means in the power toggles for the two die units involved.

As a practical matter, the thickness and construction of the various books in a given edition or run is substantially uniform, so that the books need never lie fully under one die unit at a time, it being only the occasionally defective books which unavoidably get into the production flow and could cause serious breakdown trouble and loss of time, if the safety relief feature for the power toggles were not provided.

The adjustment of the machine is very simple and quickly effected.

A change in length of the book simply requires moving the alternate die sections 15, 17, toward or away from the central infeed section by manipulation of the crank 21, to shift the mobile sections on rails 18, as heretofore described. This adjustment has the ultimate result of changing the effective length of the stroke of the feeding pawl 24 in both directions.

A change in thickness of the book simply requires manipulation of the die cranks 66, 66X, to elevate or lower the adjustable stationary die elements 60A . . . 60D, to provide the required gap between the same and their corresponding movable die elements 61A . . . 61D, similar adjustments of cranks 66L, 66XL being effective in the section shown in Fig. 1–A to position the lower dies 61E . . . 61H for the left-hand units E, F, G, H.

At the infeed section all that is required is to position the registering bars 34, 35, and the squaring irons 48 laterally to accommodate the new width of the book, and to lower or elevate the creasing and hold-down irons 40, 43.

No adjustments are required in any of the cycling switches, clutches, gears, or cam devices.

I claim:

1. A machine for building-in books comprising a plurality of compression die units grouped to extend in diametrically opposite directions from a central infeed receiving station; book-moving means at said receiving station for moving received books in alternation toward each of said opposite groups of dies, each compression die unit including a movable die member adapted to be opened and closed relative to a companion die member to seize and release a book; power-driven die-actuating mechanism for each group and drive means interconnecting the same respectively with all movable die members in the appertaining group for actuating the latter simultaneously in a duty cycle including a closure and an opening of the several movable die members of the group at least once during each said duty cycle; cycling-clutch means operatively interposed between said power-driven mechanism and said drive means and normally disconnecting the latter from the former, and master control means selectingly operable to actuate said clutch means to drivingly interconnect said last-mentioned mechanism and drive means for each die group in succession for the duration of one duty cycle; said master control means including a trigger member having operative connection with said clutch means and including a member positioned at said receiving station to be engaged by an infeeding book received thereat for actuating said clutch means; said die units in each group being spaced apart linearly a distance such that each infeeding book moved toward either of said groups will engage and push any preceding book in that group at least substantially into register with the next succeeding die unit of such group.

2. In a machine for building-in books, in combination, a series of closable pressing dies arranged in linear alignment; an infeed receiving station situated intermediate the ends of said series dividing the latter into two die groups; mechanism operable cyclically to close and open all said dies; feed means including an oscillatory member at said infeed station for engaging and moving received books in alternation toward the dies of both groups; power drive means for actuating said feed means; and control means actuated by said power drive mechanism for actuating said cyclically operable mechanism in step with the alternate feeding of received books as aforesaid.

3. In a book pressing machine, an infeed table flanked by opposite sets of linearly aligned die units each of which includes a movable die closable with a companion die, a power shaft for each set of dies, power cams on said shafts for each die unit, toggle means for each die unit actuated by one of said power cams, motor driving means connecting with power shafts through separate electromagnetic die-cycling clutch means for each said section; a motor-driven master cycling shaft, a book-feed device at said infeed table operative to feed books in alternation into said opposite die section; electromagnetic master clutch means operable to interconnect said master cycling shaft with said feed device to actuate the latter through one feeding cycle for one die section upon each operation of said master clutch means; a switch at said infeed table operated by infeeding books thereon, said switch connected to actuate said master clutch; die-cycling switch means actuated cooperably with said feed means once for each feeding operation thereby to any said die section; said die-cycling switch means connected to actuate the die-cycling clutch means for the power shaft of the appropriate die section corresponding to the direction of feeding action of said feeding means, whereby to start the power shafts in a die operating duty cycle; hold-over switch means coacting with each power shaft and connected to hold the corresponding die cycling clutch means operated for the duration of one duty cycle.

4. In a bookbinding machine, means defining an infeed receiving station, compression-die means situated on opposite sides of said station, feed means at said station acting alternately in opposite directions to move successively received books at said station toward first one then the other of said opposite die means, mechanism for actuating the opposite die means in compressing action independently, and control means including a book-operated trigger device at said receiving station, and operating control means coacting with said feed means for operating the die-actuating means lying on that side of the receiving station toward which said feed means moves a received book as aforesaid when such book has been moved to a predetermined position by the feed means.

5. In a book processing machine at least two groups of compression dies, a dividing table interpositioned between said groups of dies, feed means acting to advance books from said table in alternation toward one of said groups of dies, and control means including a trigger device operated by a book deposited in a certain position on said table for actuating said feed means, power mechanism for individually actuating said die groups, and control means cooperating with said feed means to actuate the appropriate die group toward which said feed means has moved a book at a time when such book reaches a predetermined position relative to the die group toward which it is advanced as aforesaid, books at such predetermined position being moved by succeeding books into and out of operative relation to the appertaining die group.

6. In a book building machine adapted to receive newly cased-in books, improvements comprising, to wit: a receiving station at which the newly cased-in books are to be deposited seriatim; a trigger device at said station actuated by each deposited book; at least two oppositely extending groups of pressing dies respectively situated on opposite sides of said station; book feeding means including a feed pawl and drive means operatively controlled by said trigger device for moving said pawl back and forth across said station toward said die groups to advance successively deposited books in alternation toward one or the other of said die groups; separate power drive units for actuating each of said die groups; and die control means including a master control for each die group actuated cooperatively with said book feed means for initiating operation of the appropriate power drive unit toward which said feed pawl is advancing, and at a time corresponding to a certain position of advancement of the pawl relative to each die group, the books being pushed seriatim into and out of engagement with the respective die groups by succeeding books which are respectively advanced to and beyond said certain positions.

7. In a bookbinding machine, a series of compression dies adapted to be opened and closed, means situated between the terminal ends of said series for receiving a book; a book moving device movable back and forth at said receiving means in alignment with said series of dies for pushing a book in a direction toward one or the other of said terminal ends and the intervening dies, depending upon which phase of travel said moving device is in; means for driving said moving device; mechanism operable in duty cycles for opening and closing said dies in each cycle in two distinct groups, each group including only the dies lying on one side of said receiving means; and control means actuated in timed relation to the movements of said book moving device for initiating an operating cycle for each of said groups of dies at a time when said moving device has moved to a predetermined position toward the particular die group for which the duty cycle is to be initiated, as aforesaid.

8. In a bookbinding machine of the class described, in combination, an infeed table upon which newly cased-in books are deposited one at a time; a series of linearly aligned compression dies on each of at least two opposite sides of said table, said several series also being in linear alignment, book-moving means including: an oscillating feed pawl mounted to move back and forth across said table in alignment with said series of dies and acting to advance a deposited book toward one or the other of the oppositely aligned series of dies, depending upon the direction of travel of the feed pawl at the time of engagement thereof with the book; spring-backed, power-toggle compressing means for each die; cam means for each power toggle means, a separate cam shaft and power drive means therefor for the cams of each of the opposite series of dies; cycling control means for each of said separate power drive means and each operable in a duty cycle to effect a compressing operation of the appertaining series of dies; and a master cycling control coacting with said feeding means and acting to operate the cycling control means for that particular one of the series of dies toward which said feed pawl has been moved a predetermined amount in each phase of oscillatory travel thereof to initiate a duty cycle for said particular series of dies; together with start-stop means for driving said feed pawl, and a trigger control at said table and operated by a book in a certain position thereon for starting and stopping said pawl driving means.

9. In a machine for building-in newly cased books, an infeed table, a pair of mutually reciprocable parallel registering irons on said table, a feed pawl mounted to sweep back and forth across said table between the respectively parallel irons of said pair of registering irons; drive means including an oscillatory lever for moving the feed pawl as aforesaid; a quadrangular array of shafts jointly interdriven through mitre gears; strike-lever means on certain opposite ones of said array of shafts and each including a strike member which is engageable by said oscillating drive lever means in one or the other phases of its oscillatory travel for rocking the appertaining quadrangular-array shaft, spring means interconnecting said strike lever means and normally urging said strike lever shafts toward each other to a normal position; and linking means drivingly interconnecting said quadrangular-array shafts and said registering irons for effecting reciprocatory movement of the latter in predetermined timed relation to movements of said feed pawl.

10. In a building-in machine for books, book-pressing die means adapted to be pressed against and retracted from a book, said die means being located in groups in adjacency to a common feeding station from which books are to be fed in different directions intermittently toward one or another of said groups; book-feeding mechanism including drive means and book-moving means actuated thereby and located at said feeding station for movement past a starting position thereat in respectively different directions toward each die group; triggering means at said starting position to be operated by a book deposited thereat; following books moved toward any die group by said moving means pushing preceding books in a succession directionally into and through the die means of such group; drive mechanism operable to actuate said pressing die means in pressing and retractive action; and master timing and control means actuated by said triggering means and controlling the operation of said book-feeding mechanism and said die drive mechanism in a timed relationship in which the die means of any of said groups is maintained in retracted condition during at least a part of the time said book-moving means is moving toward such group, and is in pressing condition during at least a part of the time said moving means is moving in a direction away from such group.

11. In a building-in machine for books, book-pressing die means adapted to be pressed against and retracted from a book, said die means being located in groups in adjacency to a common feeding station from which books are to be fed in different directions intermittently toward one or another of said groups; book-feeding mechanism including drive means and book-moving means actuated thereby and located at said feeding station for movement past a starting position thereat in respectively different directions toward each die group; triggering means at said starting position to be operated by a book deposited thereat; following books moved toward any die group by said moving means pushing preceding books in a succession directionally into and through the die means of such group; drive mechanism operable to actuate said pressing die means in pressing and retractive action; and master timing and control means actuated by said triggering means and controlling the operation of said book-feeding mechanism and said die drive mechanism in a timed relationship in which the die means of any of said groups is disposed in retracted condition during those movements of said book-moving means which are toward any such group, and said die means is disposed in pressing condition within a time when said book-moving means has departed said starting position in a direction moving toward a different die group.

12. In a machine for pressing books, sets of pressing dies each operable to be opened and closed upon a book fed into the same; at least two groups of said die sets situated in communication with a common receiving table to which books are to be delivered one after another; die-actuating mechanism operating in a duty cycle to open and close the die sets of one or another of said groups in each duty cycle; book-feeding mechanism and cycling means correlating the operation thereof in a timed relation to the operation of said die-actuating mechanism, said book-feeding mechanism including book-moving means at said receiving table and operatively timed to move in each duty cycle toward one or another of said die-set groups to engage and move a book on said table toward one of said die-set groups during a time when the die-set of such group is in open condition at the commencement of the appertaining duty cycle thereof; and master control means including a trigger member located at a position relative to said receiving table which is situated in advance of any die-set group with respect to the movement of a book relative to any such group; said trigger member being operated by a book to actuate said master control means; said master control means including starting and stopping means for both said die-actuating and feeding mechanisms and being operated by actuation of said trigger member to initiate and terminate the aforesaid duty-cycle operations of said die-actuating and feeding mechanisms.

13. In a machine for building-in books, means defining a starting station at which books are to be deposited in succession; sets of closable pressing dies located in different positions immediately adjoining said station; book-feeding mechanism including book-moving means at said station and movable in duty cycles past a certain starting position at said station toward each of said die sets in a predetermined order of succession to move a book from said starting position toward one or another of said die sets, the books which are moved as aforesaid in one and the same direction engaging and pushing any preceding books into and through the appertaining die set; die-operating mechanism operable in duty cycles to open and close said die sets; cycling means for said die-operating mechanism and said book-feeding mechanism and operable to initiate the respective duty cycles thereof; and master control means including a starting trigger and means actuated thereby for correlating the operation of said cycling means to effect a closure of at least one of said die sets only at a time during any duty cycle, initiated as aforesaid, when said book-moving means is located at some position or at between said starting position and a different one of said die sets.

14. In a book-pressing machine, a group of book phessers, said pressers being mounted for movement into and out of pressing positions for pressing action against a book thereat; book-feeding means located at book-starting position which is relatively central within said group and including book-advancing means movable in directions across said starting position toward any presser of the group for the purpose of advancing a book from said starting position toward one or another of said pressers, the books which are advanced as aforesaid in one and the same direction toward any particular presser of the group acting cumulatively to push any preceding book into and thence beyond the corresponding pressing position for engagement by the appertaining presser; drive mechanism for actuating the feeding mechanism and advancing means thereof as aforesaid; power-drive mechanism for actuating the pressers as aforesaid; and master timing and control means coordinating the concomitant actuation of said feeding and presser-actuating mechanisms in intermittent operating cycles in which the advancing action of said book-advancing means is timed to occur always in a direction to produce advancing movement of a book relative to a presser which is disposed out of pressing position and away from at least one presser which is disposed in pressing position, and to effect movement of at least one presser toward pressing position at a time when the direction of advancing action of said advancing means is toward a different presser of the group.

15. In a book-treating machine, at least two groups of book-dies communicating with a common feeding station; a cyclically operable actuating mechanism for each group of dies and acting in each cycle to move a die member from a disengaged position into and thereafter out of engagement with a book member positioned therebefore, to return to said disengaged position; book-advancing means movable toward one or the other of said die groups back and forth across said feeding station past a starting position near the mid-region thereof at which book members are to be deposited in succession; operating mechanism for said advancing means and adapted to be driven to effect travel thereof in two complete, successive phases, in each of which said advancing means departs from one side of said starting position and moves a predetermined distance therepast toward one or the other of said die groups to stop on the opposite side of said starting position; continuously running power drive means for each of said die-actuating mechanisms; electrically-controlled die-cycle clutch means for each die group and respectively operable to drivingly interconnect the appertaining die-actuating mechanism with the appertaining power drive means for the duration of one said cycle; continuously running feed drive means for said operating mechanism for the advancing means; electrically-controlled advance-cycling clutch means operable to drivingly interconnect said operating mechanism for the advancing means with said feed drive means for the duration of one operating cycle corresponding to one operating phase of the advancing means as aforesaid; trigger-switch means at said feeding station for actuating said advance-cycling clutch means; and die-cycling switch means connected to operate the die-cycling clutch means for one of said die groups during one of the operating phases of the advancing means, and to operate the other die-cycling clutch means during the other said operating phases; the movement of said advancing means toward any die group in either of its phases being timed to occur only during that part of the operating cycle for any such die group during which the appertaining die member is disposed in said disengaged position.

16. Apparatus as set forth in claim 15 and further characterized in that the scope of back-and-forth travel of said movable book-advancing means is of equal predetermined range in both directions past said starting position and is correlated to a certain size of book to be advanced thereby; and said die groups are mounted to shift toward and away from said feeding station, and adjusting means is provided for operation to simultaneously shift said die groups equal distances toward or away from said feeding station, whereby to permit said advancing means to advance books of a different size accurately relative to said dies.

17. In a book-processing machine, a plurality of book dies adapted to be opened and closed; die-operating mechanism for opening and closing said dies in pre-determined independent groups; means defining a starting station located relative to said die groups such that books must be moved in substantially different directions away therefrom for operative engagement with the dies of any one or another of said groups; book-feeding means operable to move books in sequence one at a time from said starting station to, and successively past the dies of one after another of said die groups in a distributing cycle so that at least one book will be fed to each said group in each distributing cycle until all die groups have been served, the distributing cycle thereafter being repeated; and control means coordinately actuating said die-operating mechanisms and said book-feeding means in a timed relation to cause closing operations of the die means of each group one after another during a time when the feeding means is acting to move a book away from any particular group in which the dies are being closed as aforesaid, and further to actuate said feeding means to move a book toward any particular die group only during a time when the dies of such group are standing in a substantially open condition.

18. In a book-processing machine, in combination, means providing an infeed station at which books to be processed are deposited one at a time; book-feeding means operable to act successively in different directions relative to said station and a book deposited thereat to engage and move the deposited books one after another therefrom a predetermined distance in successively different ones of each of said directions, books moved as aforesaid being respectively engaged by similarly-directed succeeding books to be further advanced toward a corresponding terminal position appertaining to the direction of movement thereof; book dies positioned between said infeed station and the respective terminal positions corresponding to each direction of book-feeding movement as aforesaid, the dies along each direction of movement constituting a group; the die of each group being respectively moveable to engage and disengage books directed to the appertaining terminal positions; drive means for actuating said feeding means; die-actuating mechanism for moving the dies into and out of engagement with books as aforesaid; and control means including a book-actuated triggering device and control connections actuated thereby and operatively associated with said drive means and die-actuating mechanism for coordinating the movement of the latter in a predetermined timed relation to cause book-engaging movements of certain dies to occur only at times when said feeding means is acting to cause book movement in a direction toward certain other dies appertaining to a different terminal position.

19. In a machine for building-in books, in combination, at least two groups of closeable pressing dies situated at different sides of an infeed receiving station; mechanism operable cyclically to close and open the dies of each group; feed means including a book-moving member at said infeed station moveable toward each die group for engaging and moving received books in succession toward the dies of one of each of said groups; power drive means for actuating said feed means; and control means operably controlled by said power drive mechanism for actuating said cyclically-operable mechanism in step with the successive feeding of received books as aforesaid.

20. A machine for processing books, comprising: a book-receiving support constituting a starting station; moveable book-engaging members situated at different positions located at sides of said starting station; feed means including a moveable feed member at said station and acting successively in different directions toward each said position and the book-engaging members located thereat to move successively-received books at said station toward one and then another of said positions and into operative engagement with the book-engaging members thereat; mechanism for actuating the book-engaging members appertaining to each said position in book-engaging action; and control means including a book-operated trigger device at said starting station together with operating control connections actuated thereby and cooperable with said feed means and said member-actuating mechanism for effecting operation of book-engaging members appertaining to one of said positions toward which said feed means has last moved a received book as aforesaid.

References Cited in the file of this patent

UNITED STATES PATENTS

| | | |
|---|---|---|
| 2,508,585 | Stone | May 23, 1950 |
| 2,635,262 | Schramm | Apr. 21, 1953 |
| 2,636,195 | Hicks | Apr. 28, 1953 |
| 2,644,965 | Kitcat | July 14, 1953 |